Oct. 7, 1969 J. B. SCHROER 3,471,182
RAIL-POST CONNECTION
Filed Jan. 30, 1968

INVENTOR
JOHN B. SCHROER

BY
ATTORNEYS

United States Patent Office 3,471,182
Patented Oct. 7, 1969

3,471,182
RAIL-POST CONNECTION
John B. Schroer, 815 Kenny Way,
Las Vegas, Nev. 89107
Filed Jan. 30, 1968, Ser. No. 701,736
Int. Cl. F16b 7/22
U.S. Cl. 287—54                 6 Claims

ABSTRACT OF THE DISCLOSURE

An assembly for connecting a rail to a post includes a cup-shaped plug held to the side of the post by a hook bolt, but spaced therefrom by a saddle member. Resilient prongs struck from the side of a plug resiliently hold a tube forced over the plug. A set screw may also be used, if desired, to hold the tube on the plug.

BACKGROUND OF THE INVENTION

Field of the invention

This invention relates to elements which connect tubular structures and more particularly to a device for attaching an end of one tube to the side of another tube. While the invention is particularly intended for the attachment of a hand rail to a post, it may lend itself to other uses in which tubes are joined end to end, or in which one tube is joined to other structures.

Description of the prior art

Hand rails, fences and the like are often made of individual sections joined with standard connector elements. These permit cutting particular sections to size and assembly on the site. In recent years, tubular aluminum has found increasing acceptance as post and rail elements because it is easy to manufacture, can be easily cut to length, has a pleasing ornamental appearance, and naturally forms a corrosion resistant protective coating on its outer surface.

Connector elements for joining such tubes, such as those disclosed in my earlier Patents, 2,834,621 and 3,233,871, should be inexpensive to manufacture. They should also be simple to assemble on the site in order to minimize labor costs for professional installation and to permit installation by home owners and other unskilled or inexperienced persons.

The connectors should also be concealed in order to minimize the dangers such as snagged clothing, or personal injury, created by projecting parts, and also to improve the ornamental appearance.

Prior art connectors are often expensive to manufacture because they must have a complex shape which is difficult to machine. Threaded holes often must be drilled and tapped to very close tolerances. These tolerances may make assembly difficult on the site, or may involve the risk of wastage of tubular members not cut to precise length.

SUMMARY OF THE INVENTION

Briefly stated the present invention includes a cup-shaped plug which is held within a recess in a spacer or saddle member adapted to engage the side of a post at a desired angle by a nut on a threaded hook bolt which passes through an opening in the post and the adapter plug. The adapter plug is a sheet metal stamping having a bottom and tapered side walls or legs bent downwardly therefrom to form a cup shape which fits within a tubular rail. Resilient prongs extend from the bottom of the connector in slots between the side wall portions and engage the inside of the tube.

OBJECTS OF THE INVENTION

Among the objects of the present invention is the provision of a connector element for joining tubular structures, particularly posts and hand rails, which is inexpensive to manufacture, and may be made by a simple stamping process and which does not require drilling and tapping of threaded holes to close tolerances.

A further object of the invention is to provide such a connector assembly which can be simply and quickly assembled on the site by persons who lack such skills and training, and with minimum danger of loss of connector elements which might fall into tube interiors.

A further object is the provision of such a connector element which permits adjustment of post and rail positions relative to each other within fairly broad tolerances thereby simplifying the problem of cutting and fitting rails and posts to fit particular installations.

A still further object is the provision of such a fitting in which connector assemblies are concealed within the tubular structure to improve the ornamental appearance and to minimize danger created by projecting parts.

Other objects and advantages of the invention will be apparent from the following description considered in conjunction with the accompanying drawing in which:

DESCRIPTION OF THE INVENTION

Figure 1:
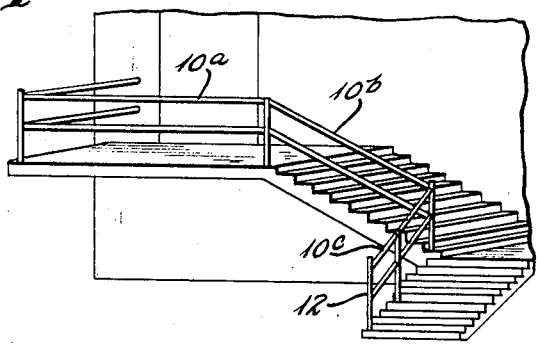
FIG. 1 is a perspective of a stairway and platform having railing structure in accordance with the present invention.

With reference to the drawings, FIG. 1, side rails such as 10a, 10b or 10c are formed from a hollow cylindrical aluminum tube and are fastened to vertical posts 12 also formed from a similar hollow cylindrical aluminum tube. A post and a rail are connected by an adapter plug 14 which fits within a rail 10 and is held in a recess 16 in a saddle member 18 by a nut 19 on a hook bolt 20 passing through openings 22 and 24 in posts 12 and plug 14, respectively.

Figure 2:
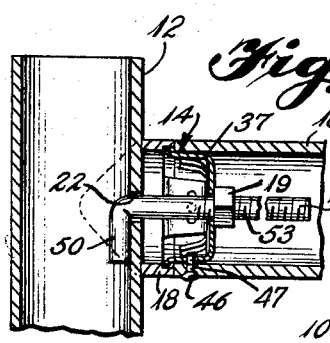
FIG. 2, a fragmentary detail in cross section of a post having a railing connected at right angles.
Figure 3:
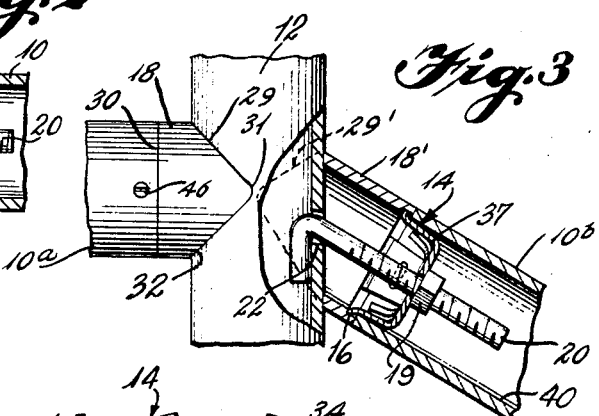
FIG. 3, a fragmentary detail with some parts broken away illustrating the attachment to a post of rails at different angles.

Saddle member 18, as shown in FIGS. 2 and 3 has a concave end 29 and a flat end 30. Flat end 30 has a countersunk recess 16 for receipt of plug 14. Concave end 29 is shaped like a saddle with extended side portions 31 and central valley 32 which is cut to conform to the side of a post. In FIG. 3, a saddle member 18' is shown which has its concave end 29' shaped to mate with a post at an angle. In either form of the saddle, the flat end 30 of the saddle member extends transversely to the saddle axis so as to align with transverse ends of rail 10.

Figure 4:
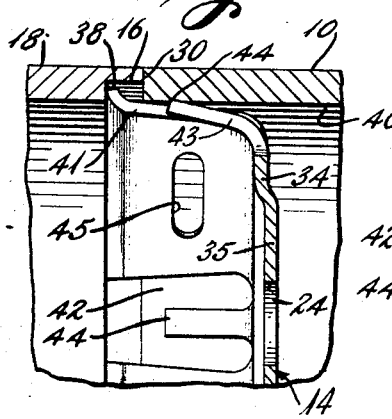
FIG. 4, an enlarged fragmentary section of a portion of an adapter plug showing it fitted within tubular members.
Figure 5:
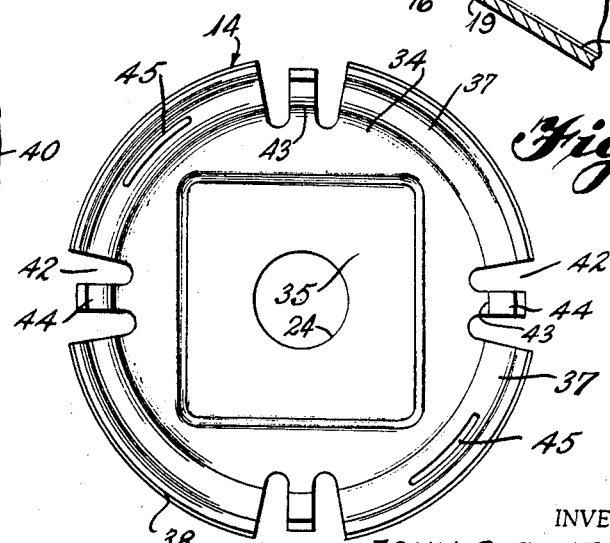
FIG. 5, an enlarged plan view of the adapter plug per se.

As shown in detail in FIGS. 4 and 5, the plug 14 is a generally cup-shaped stamping of resilient material having a circular base 34 reinforced by a square depression 35 and has four wall portions bent downwardly therefrom forming a tapered cup-shaped wall 37 diverging from the base 34. Wall 37 is of lesser diameter than the inner diameter 40 of rail 10 adjacent base 34 so as to fit easily within a rail but is of slightly greater diameter than inner surface 40 adjacent its outer end 41 so as to resiliently engage a rail 10 pushed thereon. The outer ends of wall portions 37 are curved outward to form flanges 38 which fit within recess 16 in the saddle member 18. Slots 42 are located in the cup-shaped wall 37. Central opening 24 is formed in base section 34.

Prongs 43, located within the slot 42, are bent downwardly from base 34 outwardly of and generally parallel to the side wall 37. The outer ends 44 of the prongs are sharpened and normally extends to a point radially outward of the diameter of the inner surface 40 of rails 10, so that they will snugly engage, tend to bite into the inner surface 40 of a rail pushed over the cup-shaped wall 37 and resist forces tending to separate rail and post. Circumferential slots 45 are cut within the side wall 37 to receive, if desired, set screws 46 carried by a rail 10. For most uses, the resilience of the cup-shaped walls 37 and the prongs 43 is sufficient to hold the rail and post together. However, a set screw might be useful to hold a rail such as 10c in FIG. 1 which is located at a point where the forces tending to separate rail and post may be greater.

Hook bolt 20 is formed from a cylindrical metal rod, one end of which is bent transversely at approximately the angle at which the rail intersects the post to form the hook 50. The end 53 of the hook bolt is threaded to receive nut 19.

A hole 22 is drilled in the sides of the post 12 to receive the hook 50 of the hook bolt 20. Holes 22 are normally formed while the posts are being fabricated, or may be drilled on the installation site.

ASSEMBLY

The threaded end 53 of a hook bolt 20 is inserted through the central opening 24 in a plug 14 and a nut 19 is threaded thereon. The flanges 38 of the plug are inserted into the recess 16 in saddle member 18. The hook 50 of hook bolt 20 is inserted through a hole 22 in post 12. Nut 19 is tightened to secure the plug 14 and the saddle member 18 to the post. The position of saddle member 18 may be vertically adjusted on the post within a linear distance of approximately one-fourth of its diameter by setting it in a desired position before nut 19 is tightened. The saddle member may also be rotated angularly about the post's axis within a similar linear range before the nut is tightened. The rail 10 is inserted over the cup-shaped walls 37 of the plug and pushed into engagement with the flat end 30 of saddle member 18. The prongs 43 and the lowermost portions of the tapered walls 37 are pressed inwardly by the rail's inner surface 40 and resiliently hold the rail in place. While relatively tight, the resilient holding power is low enough to permit the rail to be removed if necessary. If a more secure joint is required, set screws 46 are inserted in openings 47 in the rail and the slots 45 in the adapter plug.

What is claimed is:

1. A post and rail connection comprising a tubular generally upright post having at least one opening in the side wall thereof, a saddle member having one end engaging the exterior surface of said post and the opposite end being generally normal to the axis thereof and having a recess, a cup-shaped adapter plug constructed of resilient material, said plug including a base portion with integral tapered side walls diverging outwardly therefrom, the end of the side walls remote from the base curving outwardly to form a flange received within the recess of said saddle member, a hook bolt having one end extending through the opening in said post and the opposite end received within an opening in the base portion of said plug, means on said hook bolt connecting said saddle member and said plug in assembled relation, said plug having a plurality of flexible prongs struck outwardly from said side walls and generally parallel therewith, and a tubular rail having a bore receiving said adapted plug and engaging said diverging wall structure and said prongs, whereby said tubular rail is forced onto said adapter plug with the inner surface of said rail in engagement with the diverging walls of the adapter plug and the outwardly struck prongs biting into the rail member to hold such rail member in position.

2. Apparatus for connecting first and second generally tubular members in abutting coextensive relationship, said apparatus comprising a cup-shaped adapter plug constructed of one piece resilient material, said plug including a generally circular base portion with an integral tapered side wall diverging outwardly therefrom, the end of the side wall remote from the base portion curving outwardly to provide a mounting flange receivable within a recess in said first generally tubular member, a plurality of slots disposed generally axially of said side wall and extending from said remote end to said base portion, at least one flexible prong in each of said slots and having a free end engageable with the bore of said second tubular member, said prongs being located outwardly of said side wall and generally parallel therewith, the axial distance from said base portion to said mounting flange being greater than that from said base portion to said free end of said prongs, means for mounting said plug in concentric position adjacent to one end of said first tubular member and in a position to extend axially outwardly of the end, whereby axial movement of said second tubular members toward said first tubular member causes engagement between said side walls of the adapter plug and the inner surface of said second tubular member and said prongs will bite into the material of said second tubular member to maintain the first and second tubular members in assembled relation.

3. The structure of claim 2 including at least one opening in said side wall for receiving a fastener carried by said second tubular member to lock said plug and said second member in assembled relation.

4. The structure of claim 2 in which said means for mounting said plug includes a hook bolt and nut.

5. The structure of claim 2 in which said free end of said prong is sharp to facilitate biting into the bore of said second tubular member.

6. Apparatus for connecting first and second generally tubular members in abutting coextensive relationship, said first tubular member having abutment means, said apparatus comprising a cup-shaped adapter plug constructed of one piece resilient material, said plug including a generally circular base portion with an integral tapered side wall diverging outwardly therefrom, the end of the side wall remote from the base portion providing a mounting flange engageable with the abutment means in said first generally tubular member, flexible prong means struck outwardly from said side wall and having a free end engageable with the bore of said second tubular member, the free end of said prong means being normally disposed outwardly of said side wall, the axial distance from said base portion of said mounting flange being greater than that from said base portion to said free end of said prong means, said plug adapted to be mounted in concentric position adjacent to one end of said first tubular member and in a position to extend axially outwardly of the end, whereby axial movement of said second tubular member toward said first tubular member causes engagement between said side wall of the adapter plug and the bore of said second tubular member, the free ends of said prong means biting into the material of said second tubular member to maintain the first and second tubular members in assembled relation.

References Cited

UNITED STATES PATENTS

| | | | |
|---|---|---|---|
| 2,670,226 | 2/1954 | Becker | 85—36 X |
| 2,859,469 | 11/1958 | Stockdale | 287—126 X |
| 2,930,638 | 3/1960 | Morrissey. | |
| 2,982,989 | 5/1961 | Heyer | 151—41.73 X |
| 3,233,871 | 2/1966 | Schroer | 256—65 X |

FOREIGN PATENTS

| | | |
|---|---|---|
| 958,706 | 5/1964 | Great Britain. |
| 1,067,091 | 5/1967 | Great Britain. |

RAMON S. BRITTS, Primary Examiner

U.S. Cl. X.R.

256—21, 65; 285—191; 287—126